United States Patent [19]

Mills

[11] Patent Number: 5,745,867
[45] Date of Patent: Apr. 28, 1998

[54] METHOD AND APPARATUS FOR REDUCING MESSAGE LENGTH WITHIN A COMMUNICATION SYSTEM

[75] Inventor: Donald C. Mills, Glenview, Ill.

[73] Assignee: Motorola, Inc., Schaumburg, Ill.

[21] Appl. No.: 731,108

[22] Filed: Oct. 9, 1996

[51] Int. Cl.$^6$ ............................................. G06F 165/00
[52] U.S. Cl. ...................... 701/207; 701/202; 340/988
[58] Field of Search .................................. 701/200, 202, 701/207, 208, 209, 210, 211, 215, 217; 73/178 R; 340/988, 990, 995

[56] References Cited

U.S. PATENT DOCUMENTS

| | | | |
|---|---|---|---|
| 4,954,958 | 9/1990 | Savage et al. | 701/202 |
| 5,067,081 | 11/1991 | Person | 701/202 |
| 5,172,321 | 12/1992 | Ghaem et al. | 701/202 |
| 5,544,061 | 8/1996 | Morimoto et al. | 701/202 |
| 5,648,769 | 7/1997 | Sato et al. | 701/200 |

Primary Examiner—Gary Chin
Attorney, Agent, or Firm—Kenneth A. Haas

[57] ABSTRACT

Latitude and longitude information within a wireless navigation and information system (200) is transmitted from route planning equipment (207) to a base site (201). A translator (203) converts each reference point from an absolute coordinate to a relative coordinate by subtracting a reference geographic location from each absolute coordinate (350). The base site (201) then sends a message comprising the relative coordinates for each reference point to the remote unit (213). Finally, the remote unit (213) utilizes the reference geographic location and calculates absolute coordinates for each reference point and passes this information to any navigation equipment (705) that is coupled to the remote unit (213). Broadcasting only the relative coordinates of each reference point to the remote unit (213) allows reference points to be transmitted to the remote unit (213) in a shorter length message than with prior-art methods.

10 Claims, 6 Drawing Sheets

METHOD AND APPARATUS FOR REDUCING MESSAGE LENGTH WITHIN A COMMUNICATION SYSTEM

FIELD OF THE INVENTION

The present invention relates generally to reducing message length within a communication system and, in particular, to reducing message length within wireless navigation and information systems.

BACKGROUND OF THE INVENTION

Typical navigation systems provide users with point-to-point guidance when given a starting and an ending point. For example, a user not familiar with a particular area might have a need to get from point A to point B. If provided with a starting point (point A) and an ending point (point B), a typical navigation system will calculate the best route between the starting and ending points, and provide the route to the user. Wireless navigation systems are particularly useful in that they allow users real-time access to the navigation system while en route. This allows for continuous route planning without the need to pre-plan a journey. Such a wireless navigation system is shown in FIG. 1.

Figure 1:
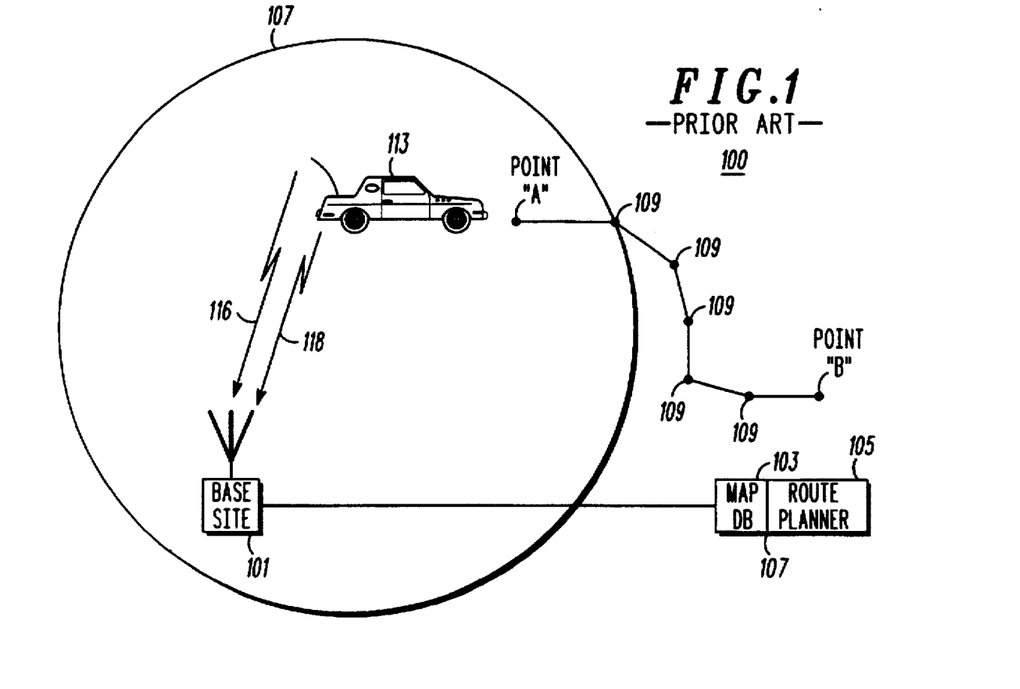
FIG. 1 illustrates a prior-art wireless navigation system.

FIG. 1 illustrates a prior-art wireless navigation system 100. Navigation system 100 may, for example, be an analog or digital wireless navigation system utilizing system protocols such as, but not limited to, the Narrowband Advanced Mobile Phone Service (NAMPS) protocol, the Advanced Mobile Phone Service (AMPS) protocol, the Code Division Multiple Access (CDMA) protocol, the Personal Digital Cellular (PDC) protocol, the Global System for Mobile Communications (GSM) protocol, Two-Way Paging protocols, or the United States Digital Cellular (USDC) protocol. Navigation system 100 includes base site (BTS) 101 having respective service coverage area 107, remote unit 113, and route planning equipment 107. As shown, route planning equipment 107 includes map data base 103 and route planner 105.

During operation, remote unit 113 notifies base site 101 (via uplink communication signal 116) of a desire to go from point A to point B. Base site 101 provides starting and ending point information to route planning equipment 107, and utilizing map database 103 and route planner 105, route planning equipment 107 calculates a route from point A to point B and provides information regarding the route to base site 101. Typically, route planning equipment 107 provides base site 101 with a series of reference points 109 (sometimes referred to as way or shape points) that define a geographic location where remote unit 113 needs to take some action (i.e. turn left or right, go straight . . . etc.). Base site 101 transmits the series of reference points 109 to remote unit 113 via downlink communication signal 118. Each reference point 109 is represented by a 22 bit latitude and a 22 bit longitude number representing the location of reference point 109. (22 bits are needed for 50' resolution typically required for navigation systems).

Since a typical route may contain hundreds of reference points 109, the length of the message transmitted to the remote unit can be unnecessarily long. Thus a need exists for a method and apparatus for reducing message length in a wireless navigation system.

DETAILED DESCRIPTION OF THE DRAWINGS

Stated generally, latitude and longitude information within a wireless navigation and information system is transmitted from route planning equipment to a base site. A translator converts each reference point from an absolute coordinate to a relative coordinate by subtracting a constant value from each absolute coordinate. In the preferred embodiment of the present invention a reference geographic location is subtracted from each absolute coordinate. The base site then sends a message comprising the relative coordinates for each reference point to the remote unit. Finally, the remote unit utilizes the reference geographic location and calculates absolute coordinates for each reference point and passes this information to any navigation equipment that is coupled to the remote unit. Broadcasting only the relative coordinates of each reference point to the remote unit allows reference points to be transmitted to the remote unit in a shorter length message than with prior-art methods.

The present invention encompasses a method for reducing message length comprising the steps of determining an absolute coordinate of a reference point and determining a latitude and a longitude. Next, a relative coordinate of the reference point is determined based on the absolute coordinate of the reference point and the latitude and the longitude. Finally, the relative coordinate of the reference point is transmitted. Transmitting only the relative coordinates of each reference point to the remote unit allows reference points to be transmitted to the remote unit in a shorter length message than with prior-art methods.

Another embodiment of the present invention encompasses method for reducing message length within a communication system comprising the steps of determining a latitude and a longitude of a reference point and determining a reference geographic location of a base site. Next, the reference geographic location of the base site is subtracted from the latitude and longitude of the reference point to produce a relative coordinate of the reference point. Finally, the relative coordinate of the reference point is transmitted. Transmitting only the relative coordinates of each reference point to the remote unit allows reference points to be transmitted to the remote unit in a shorter length message than with prior-art methods.

Another embodiment of the present invention encompasses an apparatus comprising navigation equipment for determining a latitude and a longitude of a reference point, a logic unit for determining a latitude and a longitude of a base site and a relative coordinate of the reference point based on the latitude and the longitude of the reference point and the latitude and the longitude of the base site, and a transceiver for transmitting a message comprising the relative coordinate of the reference point.

Prior to describing a preferred embodiment, the following definitions set out necessary background language:

Reference Point—a geographic location (sometimes referred to as a way point or a shape point) where a remote unit needs to take some action (i.e., turn left, right, go straight . . . etc.);

Absolute Coordinate—Latitude and longitude coordinates that define a geographic location in absolute terms;

Relative Coordinate—Latitude and longitude coordinates produced by subtracting a Reference Geographic Location from an Absolute Coordinate;

Reference Geographic Location—A constant value utilized to produce Relative Coordinates. In the preferred embodiment of the present invention, the fixed geographic position is utilized as a reference geographic location.

Figure 2:
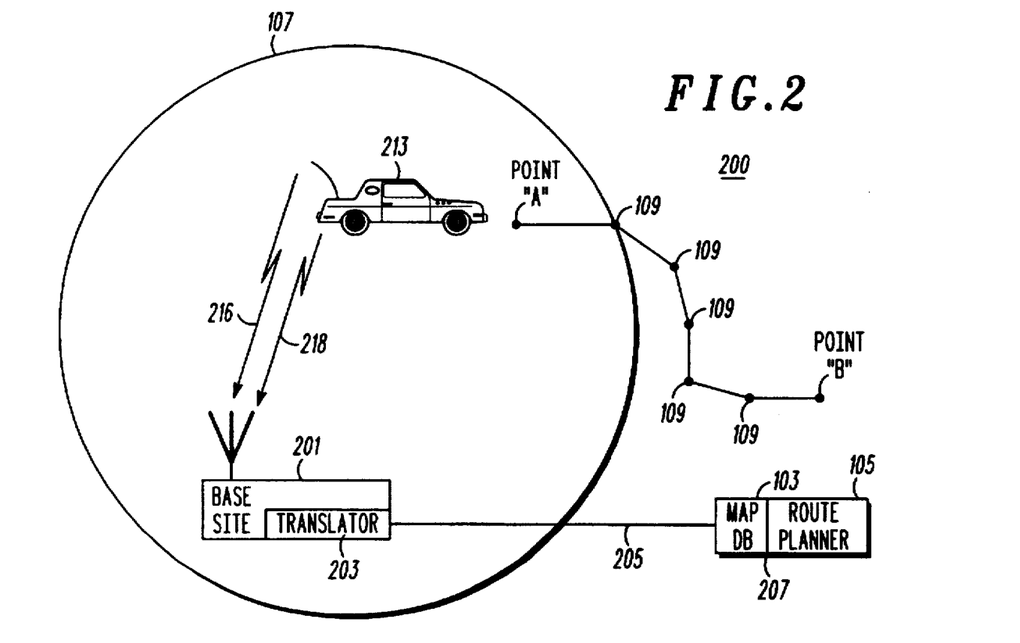
FIG. 2 illustrates a wireless navigation system in accordance with a preferred embodiment of the present invention.

FIG. 2 illustrates a wireless navigation system 200 in accordance with a preferred embodiment of the present invention. In the preferred embodiment of the present invention, navigation system 200 utilizes a Code Division, Multiple Access (CDMA) system protocol as described in Cellular System Remote unit-Base Station Compatibility Standard of the Electronic Industry Association/Telecommunications Industry Association interim standard 95A (TIA/EIA/IS-95A), which is incorporated by reference herein. (TIA/EIA can be contacted at 2001 Pennsylvania Ave. NW Washington, D.C. 20006). In alternate embodiments of the present invention, navigation system 200 may, for example, be an analog or digital navigation system 200 utilizing protocols including, but not limited to, the Narrowband Advanced Mobile Phone Service (NAMPS) protocol, the Advanced Mobile Phone Service (AMPS) protocol, the Personal Digital Cellular (PDC) protocol, the Global System for Mobile Communications (GSM) protocol, Cellular Digital Packet Data (CDPD) protocol, the United States Digital Cellular (USDC) protocol, or any number of paging protocols (ReFLEX, PACT, . . . , etc.).

Navigation system 200 includes base site 201 having respective service coverage area 207, translator 203, remote unit 213, and route planning equipment 207. As shown, route planning equipment 207 includes map data base 103 and route planner 105. In the preferred embodiment of the present invention map data base 103 is a NavTech™ Database supplied by Navigation Technologies Corporation, located at 740 East Arques Ave., Sunnyvale, Calif. 94086. Additionally, in the preferred embodiment of the present invention route planning equipment 207 is equipment similar to DeLorme's CyberRouter™. DeLorme can be reached at Lower Main Street, PO Box 298 Freeport, Me. 04032. As shown, remote unit 213 is communicating with base site 101 via uplink communication signal 216 and base site 101 is communicating with remote unit 213 via downlink communication signal 218. In the preferred embodiment of the present invention, route planning equipment 207 is located external to base site 101 and communicates with base site 101 via landline connection 205, but in alternate embodiments of the present invention, route planning equipment 207 may be located internal to base site 201.

As described in TIA/EIA/IS-95A section 7.7.2.3.2.1, in its System Parameters Message, base site 201 periodically broadcasts its geographic location (latitude/longitude information accurate to 0.25 seconds) along with its base identification. In the preferred embodiment of the present invention, base site's 201 geographic location is utilized as a reference geographic location, but in alternate embodiments of the present invention, the reference geographic location can be any fixed point external or internal to base site 201. Remote unit 213 receives the reference geographic location and stores it in a reference location table (not shown). During operation, remote unit 213 notifies base site 201 (via uplink communication signal 216) of a desire to go from point A to point B. Base site 201 provides starting and ending point information to route planning equipment 207 via landline 205, and utilizing map database 103 and route planner 105, route planning equipment 207 calculates a route from point A to point B and provides information regarding the route to base site 201. In the preferred embodiment of the present invention, route planning equipment 207 provides translator 203 with a series of 44 bit absolute coordinates that define the location of reference points 109. Translator 203 determines a relative coordinates of each reference point 109 by subtracting a constant value from each absolute coordinate and transmits the relative coordinates of each reference point to remote unit 213. As discussed above, in the preferred embodiment of the present invention the reference geographic location is subtracted from each absolute coordinate in order to obtain the relative coordinates of each reference point. Remote unit 213 receives the relative coordinates of each reference point 109 and utilizing the reference geographic location broadcast by base site 201, calculates the absolute coordinates of each reference point 109 by adding the reference geographic location to each relative coordinate. Broadcasting only the relative coordinates of each reference point to remote unit 213 allows reference points to be transmitted to remote unit 213 in a shorter length message than with prior-art methods.

Figure 3:
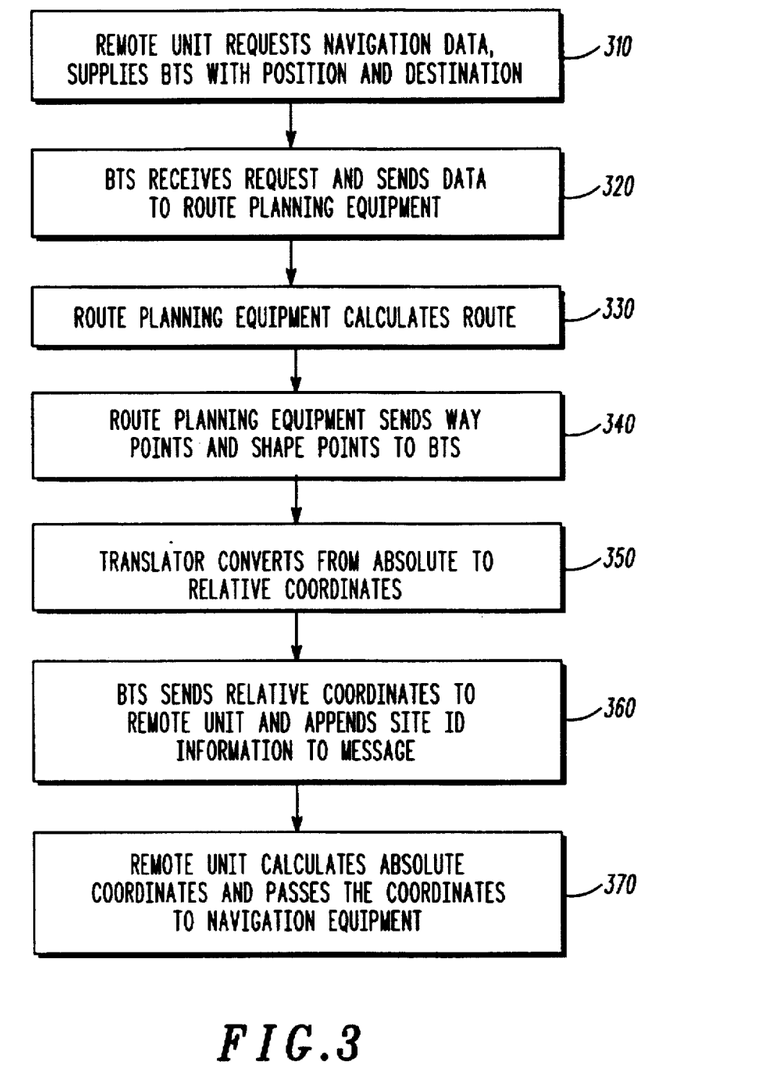
FIG. 3 is a flow chart illustrating operation of the wireless navigation system of FIG. 2 in accordance with a preferred embodiment of the present invention.

FIG. 3 is a flow chart illustrating operation of wireless navigation system 200 of FIG. 2 in accordance with a preferred embodiment of the present invention. The logic flow begins at step 310 where the remote unit 213 requests a route plan from base site 201, and supplies base site 201 with a current position and a destination. Next, at step 320, base site 201 receives remote unit's 213 request and supplies the position and destination data to route planning equipment 207. At step 330, route planning equipment 207 calculates way points and shape points (reference points) associated with the route and at step 340, supplies this information to base site 201 in the form of absolute coordinates. Once the route information has been supplied to base site 201, translator 203 converts each reference point from an absolute coordinate to a relative coordinate by subtracting the reference geographic location from each absolute coordinate (step 350). At step 360, base site 201 sends a message comprising the relative coordinates for each reference point to remote unit 213. In the preferred embodiment of the present invention, the message comprising reference point information is originated with a 16 bit header that identifies base site 201 to remote unit 213. In particular, the message is initiated utilizing the BASE_ID field as described in TIA/EIA/IS-95A "systems parameters message" section 7.7.2.3.2.1. Base site identification is supplied to remote unit 213 to account for situations where remote unit 213 is in communication with more than one base site (soft handoff). By supplying remote unit 213 with base site identification, remote unit 213 can determine what base site's reference geographic location to utilize when calculating the absolute coordinates of reference point. Finally, at step 370 remote unit 213 utilizes the reference geographic location and calculates absolute coordinates for each reference point and passes this information to any navigation equipment that is coupled to remote unit 213.

Figure 4:
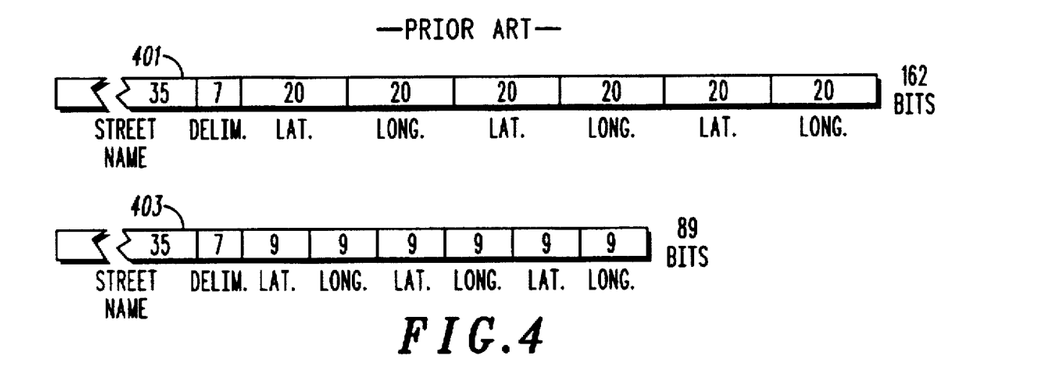
FIG. 4 illustrates a message transmitted via the prior art method and a message transmitted according to the preferred embodiment of the present invention.

FIG. 4 illustrates a message transmitted via the prior art method and a message transmitted according to the preferred embodiment of the present invention. In particular, FIG. 4 illustrates transmission of a street name (35 bits), delimiter (seven bits), and three reference points. Prior-art methods of transmission (represented by message 401) will transmit a 162 bit reference point 401 comprising a string of 42 bits representing the street name (in this case "Maple") and delimiter, followed by 120 bits of geographic information (latitude/longitude coordinates where remote unit 213 needs to take action). In particular, each letter and the delimiter is represented in seven bits, with each latitude/longitude reference point represented in 40 bits. As is evident, the preferred embodiment of the present invention replaces the 162 bit long message with a message that is only 89 bits long. This is shown with regards to message 403, where the prior art 120 bit long absolute latitude/longitude data has been replaced by 54 bit long relative latitude/longitude data.

Figure 5:
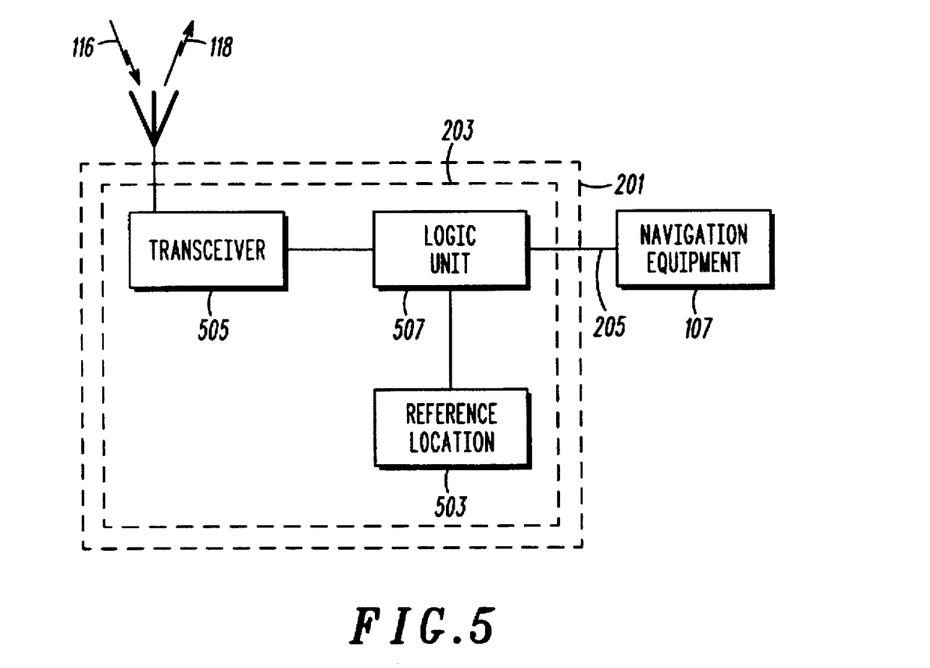
FIG. 5 illustrates a translator of FIG. 2 in accordance with a preferred embodiment of the present invention.
Figure 6:
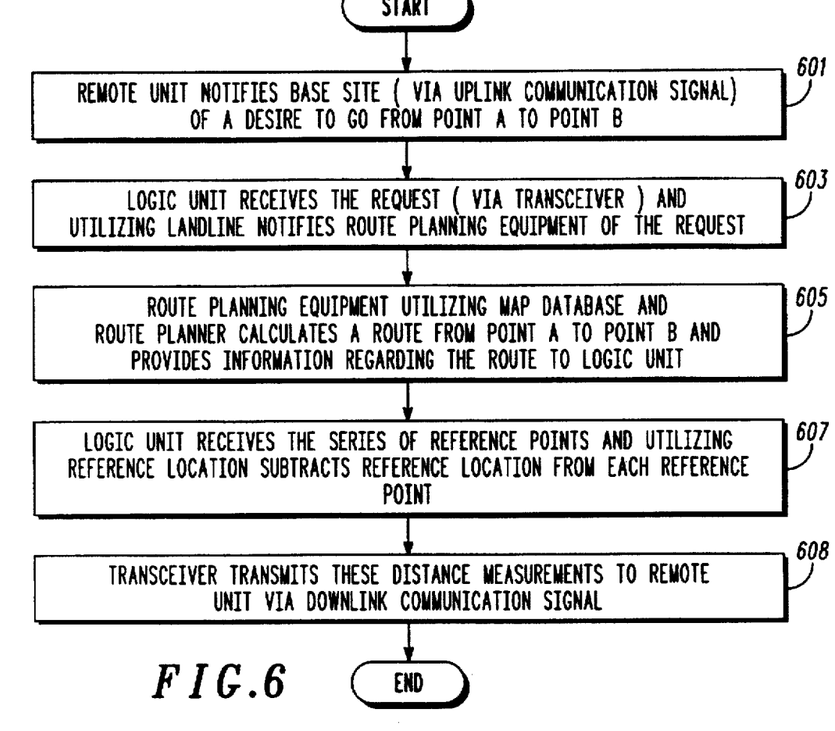
FIG. 6 is a flow chart illustrating operation of the translator of FIG. 2 in accordance with a preferred embodiment of the present invention.

FIG. 5 illustrates a translator 203 of FIG. 2 in accordance with a preferred embodiment of the present invention. Translator 203 includes transceiver 505, logic unit 507, and reference geographic location storage 503. Operation of translator 203 in accordance with a preferred embodiment of the present invention occurs as illustrated in FIG. 6. At step 601 remote unit 213 notifies base site 201 (via uplink communication signal 216) of a desire to go from point A to point B. Next, at step 603, logic unit 507 receives the request (via transceiver 505) and utilizing landline 205, notifies route planning equipment 207 of the request. At step 605 route planning equipment 207, utilizing map database 103 and route planner 105, calculates a route from point A to point B and provides information regarding the route to logic unit 507. In the preferred embodiment of the present invention, route planning equipment 207 provides translator 203 with a series of 44 bit reference points 109 identifying the absolute coordinates of each reference point. At step 607, logic unit 507 receives the series of reference points 109 and utilizing reference geographic location storage 503, subtracts the reference geographic location from each reference point to produce a series of relative coordinates of each reference point. Next, at step 609 transceiver 505 transmits the relative coordinates of each reference point to remote unit 213 via downlink communication signal 218.

Figure 7:
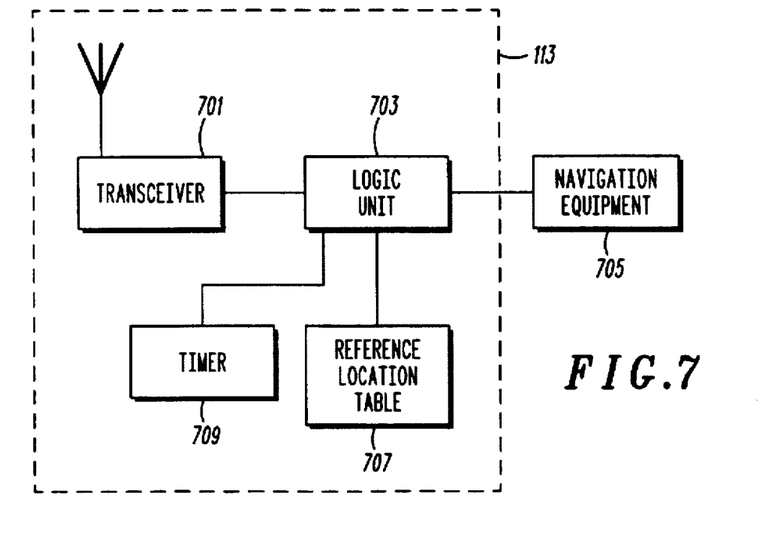
FIG. 7 illustrates the remote unit of FIG. 2 in accordance with a preferred embodiment of the present invention.
Figure 8:
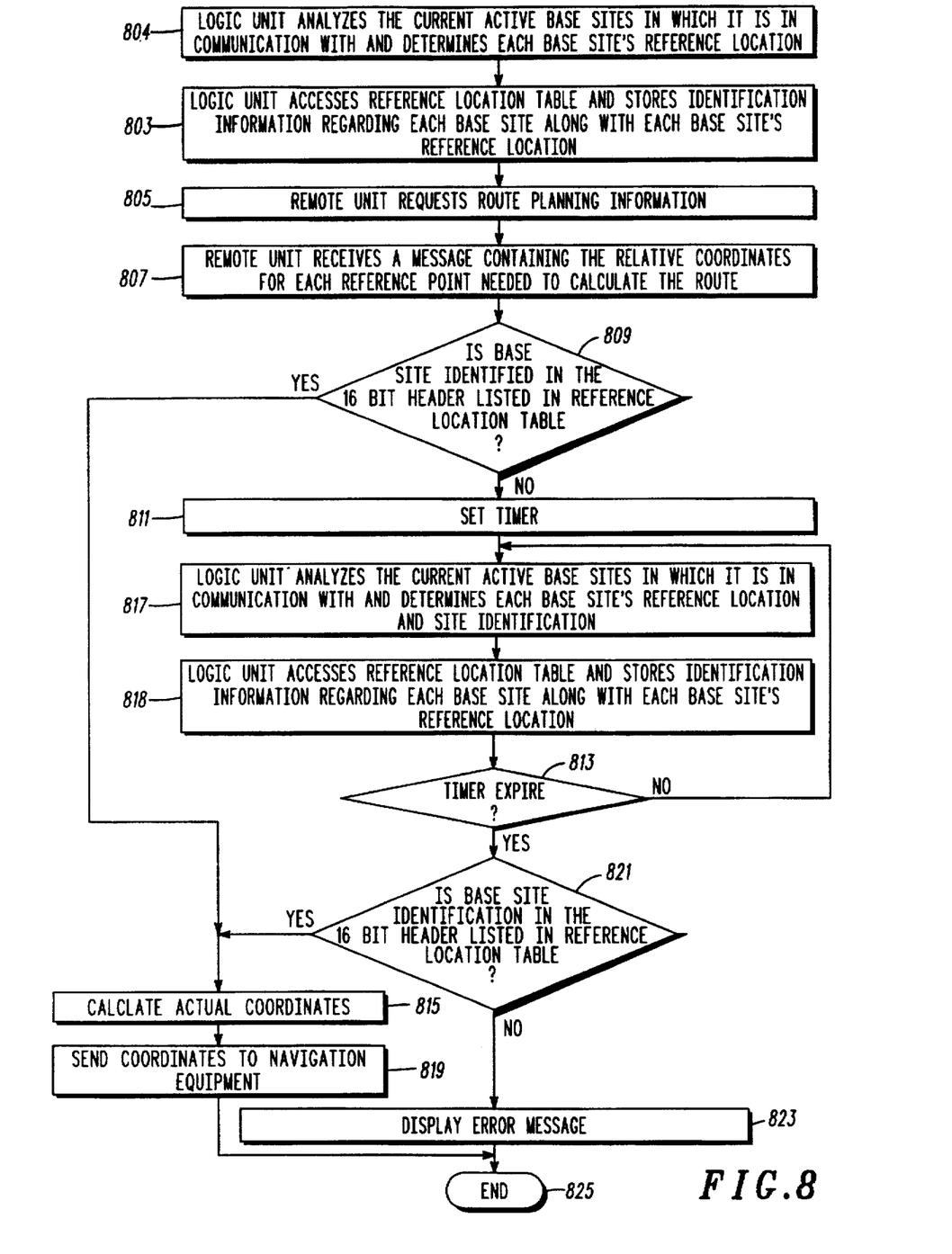
FIG. 8 is a flow chart illustrating operation of the remote unit of FIG. 2 in accordance with a preferred embodiment of the present invention.

FIG. 7 illustrates remote unit 213 of FIG. 2 in accordance with a preferred embodiment of the present invention. Remote unit 213 comprises transceiver 701, logic unit 703, and reference location table 707. As shown, navigation equipment 705 is suitably coupled to remote unit 213. Operation of remote unit 213 occurs as illustrated in FIG. 8. At step 801 logic unit 703 analyzes the current active base sites that it is in communication with and determines each base site's reference geographic location and site identification. As discussed above, this information is determined from each base site's System Parameter Message that is transmitted to remote unit 213. Next, at step 803, logic unit 703 accesses reference location table 707 and stores the identification information regarding each base site along with each base site's reference geographic location. At step 805 remote unit 213 requests route planning information and at step 807, remote unit receives a message comprising the relative coordinates of for each reference point needed to calculate the route. As discussed above, in the preferred embodiment of the present invention the message contains a 16 bit header that identifies base site whose reference geographic location is being utilized in producing the relative coordinates of each reference point.

Continuing, at step 809 logic unit 703 accesses reference location table 707 and determines if the base site identified in the 16 bit header is listed in reference location table 707. This step is needed for cases in which remote unit 213 enters soft handoff with a base site and has yet to acquire a reference geographic location for the particular base site. If, at step 809 it is determined that the base site identified in the 16 bit header is listed in reference location table 707, then the logic flow continues to step 815. If at step 809 it is determined that the base site identified in the 16 bit header is not listed in reference location table 707, then a timer is set (step 811) and at step 817, logic unit 703 analyzes the current active base sites that it is in communication with, determines each base site's reference geographic location and site identification. Next, at step 818 logic unit 703 accesses reference location table 707 and stores identification information regarding each base site along with each base site's reference geographic location. At step 813 logic unit 703 determines if timer 709 has expired, and if not, the logic flow returns to step 817. If at step 813 it has been determined that timer 709 has expired, then the logic flow continues to step 821 where it is again determined if the base site identified in the 16 bit header is listed in reference location table 707, and if not, the logic flow continues to step 823 where an error message is displayed on remote unit 213. If at step 821 it is determined that the base site identified in the 16 bit header is listed in reference location table 707, then the logic flow continues to step 815. At step 815 logic unit 703 retrieves the reference geographic location corresponding to the base site identified in the 16 bit header and calculates absolute coordinates of each reference point by adding the reference geographic location to the relative coordinates of each reference point. The absolute coordinates of each reference point is sent to navigation equipment (step 819) and the logic flow ends at step 825.

EXAMPLE

Figure 9:
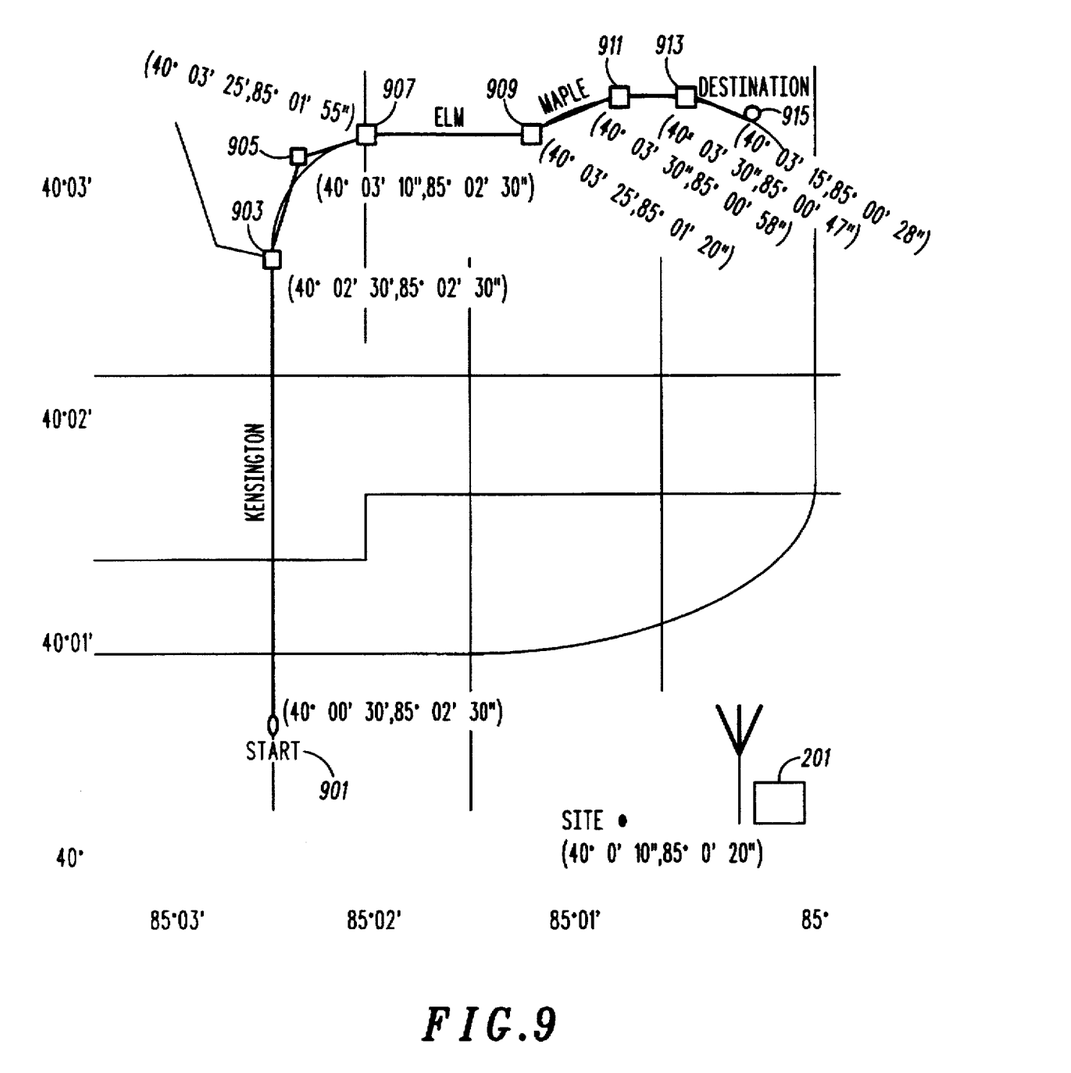
FIG. 9 illustrates an example of a route that can be planned by route planning equipment.

The following examples serve to give illustrations of the practice of this invention, and is not intended in any way to limit the scope of the invention. FIG. 9 illustrates an example of a route planned by route planning equipment. In this example, a user desires to travel from start point 901 to destination point 915. As is evident in FIG. 9, start point 901 is located at 40° 00' 30" latitude and 85° 02' 30" longitude and destination point 915 is located at 40° 03' 15" latitude and 85° 00' 28". The route in between start point 901 and destination point 915 contains three way points (901, 907, and 909) and five shape points (903, 905, 911, 913, and 915). Additionally, base site 201 transmits a reference geographic location of 40° 00' 10" latitude and 85° 00' 20". Table 1 below illustrates absolute and relative coordinates (in seconds) of the route illustrated in FIG. 9.

TABLE 1

Absolute and relative coordinates (in seconds) of the route illustrated in FIG. 9

| Point | Abs. Lat. (seconds) | Abs. Long. (seconds) | Rel. Lat. (seconds) | Rel. Long. (seconds) |
|---|---|---|---|---|
| 201 (base) | 144010 | 306020 | 0 | 0 |
| 901 | 144030 | 306150 | 20 | 130 |
| 903 | 144150 | 306150 | 140 | 130 |
| 905 | 144190 | 306143 | 180 | 123 |
| 907 | 144205 | 306115 | 195 | 95 |
| 909 | 144205 | 306080 | 195 | 60 |
| 911 | 144210 | 306058 | 200 | 38 |

TABLE 1-continued

Absolute and relative coordinates (in seconds) of the route illustrated in FIG. 9

| Point | Abs. Lat. (seconds) | Abs. Long. (seconds) | Rel. Lat. (seconds) | Rel. Long. (seconds) |
|---|---|---|---|---|
| 913 | 144210 | 306047 | 200 | 27 |
| 915 | 144195 | 306028 | 185 | 8 |

The prior-art route plan message would be transmitted as follows: Kensington/+144030+306150+144150+306150+ 144190+30614 3Elm/+144205+306115Maple/+144205+ 306080+144210+3060 58+144210+306047+144195+ 306028. With each number being represented in 20 bits, each letter being represented in 7 bits, and the delimiter being represented in 7 bits, the above message is transmitted in a total of 197 bits. By subtracting the reference geographic location from each reference point prior to transmission, transmission of the route plan message in accordance with a preferred embodiment of the present invention can be transmitted in 131 bits (each number represented in 9 bits) as follows: Kensington/+20+130+ 140+130+180+123Elm/+195+95Maple/+19 5+60+200+38+ 200+27+185+8. As is evident broadcasting only the relative coordinates of each reference point to remote unit 213 allows reference points to be transmitted to remote unit 213 in a shorter length message than with prior-art methods.

The descriptions of the invention, the specific details, and the drawings mentioned above, are not meant to limit the scope of the present invention. For example, in addition to transmitting relative coordinates from base site 201 to remote unit 213, relative coordinates can be transmitted from remote unit 213 to base site 201 when supplying location information to base site 201. It is the intent of the inventors that various modifications can be made to the present invention without varying from the spirit and scope of the invention, and it is intended that all such modifications come within the scope of the following claims.

What is claimed is:

1. A method comprising the steps of:
   determining an absolute coordinate of a reference point;
   determining a latitude and a longitude of a geographic location;
   determining a relative coordinate of the reference point based on the absolute coordinate of the reference point and the latitude and the longitude; and
   transmitting to a remote unit via wireless transmission, the relative coordinate of the reference point for subsequent determination, by the remote unit, of the absolute coordinate of the reference point based on the relative coordinate of the reference point and the latitude and the longitude.

2. The method of claim 1 wherein the step of determining by the remote unit comprises the step of adding the latitude and the longitude to the relative coordinate of the reference point to produce the absolute coordinate of the reference point.

3. The method of claim 1 wherein the step of determining the relative coordinate of the reference point comprises the step of subtracting the latitude and the longitude from the absolute coordinate of the reference point.

4. The method of claim 1 wherein the step of transmitting a message comprising the relative coordinate of the reference point further comprises the step of transmitting the message comprising a header identifying a base site.

5. The method of claim 1 wherein the step of determining the absolute coordinate of the reference point comprises the step of determining a latitude and a longitude of the reference point.

6. A method for reducing message length within a communication system, the method comprising the steps of:
   determining a latitude and a longitude of a reference point;
   determining a reference geographic location of a base site;
   subtracting the reference geographic location of the base site from the latitude and longitude of the reference point to produce a relative coordinate of the reference point;
   transmitting a message comprising the relative coordinate of the reference point and a base site identification wherein a length of the message comprising the relative coordinate of the reference point is shorter than a similar message comprising the latitude and longitude of the reference point
   receiving, by the remote unit the message comprising the relative coordinate of the reference point and the base site identification;
   determining the reference geographic location of the base site based on the transmitted base site identification; and
   adding the reference geographic location of the base site to the relative coordinate of the reference point to produce the latitude and the longitude of the reference point wherein a length of the message comprising the relative coordinate of the reference point is shorter than the similar message comprising the latitude and longitude of the reference point.

7. An apparatus comprising:
   navigation equipment for determining a latitude and a longitude of a reference point;
   a logic unit for determining a latitude and a longitude of a base site and a relative coordinate of the reference point based on the latitude and the longitude of the reference point and the latitude and the longitude of the base site; and
   a transceiver for transmitting to a remote unit via wireless transmission, a message comprising the relative coordinate of the reference point for subsequent determination, by the remote unit, of the absolute coordinate of the reference point based on the relative coordinate of the reference point and the latitude and the longitude.

8. The apparatus of claim 7 wherein the logic unit determines the relative coordinate of the reference point by subtracting the latitude and the longitude of the base site from the latitude and longitude of the reference point.

9. The apparatus of claim 7 wherein the message comprising the relative coordinate of the reference point comprises a header identifying a base site.

10. The apparatus of claim 7 wherein a length of the message comprising the relative coordinate of the reference point is shorter than a length of a similar message comprising the latitude and longitude of the reference point.

* * * * *